United States Patent [19]

Kitagishi et al.

[11] Patent Number: 4,536,073
[45] Date of Patent: Aug. 20, 1985

[54] APPARATUS FOR DETECTING A CONDITION OF SHARPEST FOCUS

[75] Inventors: Nozomu Kitagishi, Tokyo; Kenji Suzuki; Shinji Sakai, both of Kanagawa, all of Japan

[73] Assignee: Canon Kabushiki Kaisha, Tokyo, Japan

[21] Appl. No.: 524,300

[22] Filed: Aug. 18, 1983

[30] Foreign Application Priority Data

Aug. 20, 1982 [JP] Japan .................. 57-145294

[51] Int. Cl.³ ............................................. G03B 13/20
[52] U.S. Cl. ..................................... 354/406; 354/409
[58] Field of Search ............... 354/402, 406, 400, 407; 350/173

[56] References Cited

U.S. PATENT DOCUMENTS 3,614,921 10/1971 Yamanaka et al. ................ 354/402
3,827,064 7/1974 Kiyohara et al. .................. 354/402
4,019,049 4/1977 Schulz ................................. 354/406

Primary Examiner—L. T. Hix
Assistant Examiner—David M. Gray
Attorney, Agent, or Firm—Toren, McGeady, Stanger, Goldberg & Kiel

[57] ABSTRACT

A real image of an object is projected by an objective lens to at least a pair of photosensitive elements on opposite side of a prescribed focal plane, wherein use is made of a secondary image forming lens between the objective lens and the pair of photosensitive elements to achieve a great increase in the range of detection of in-focus condition.

8 Claims, 23 Drawing Figures

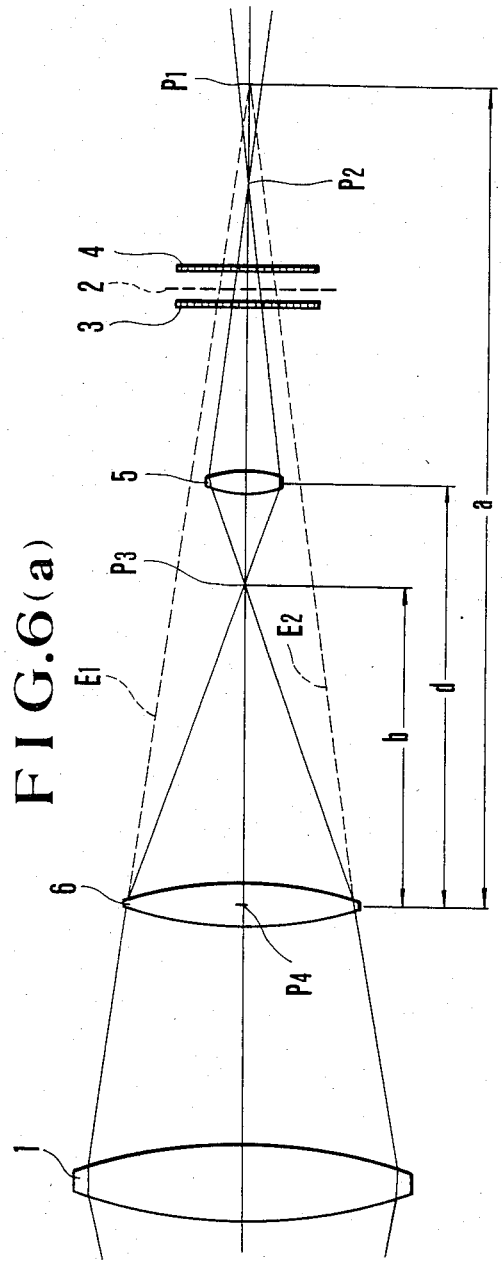
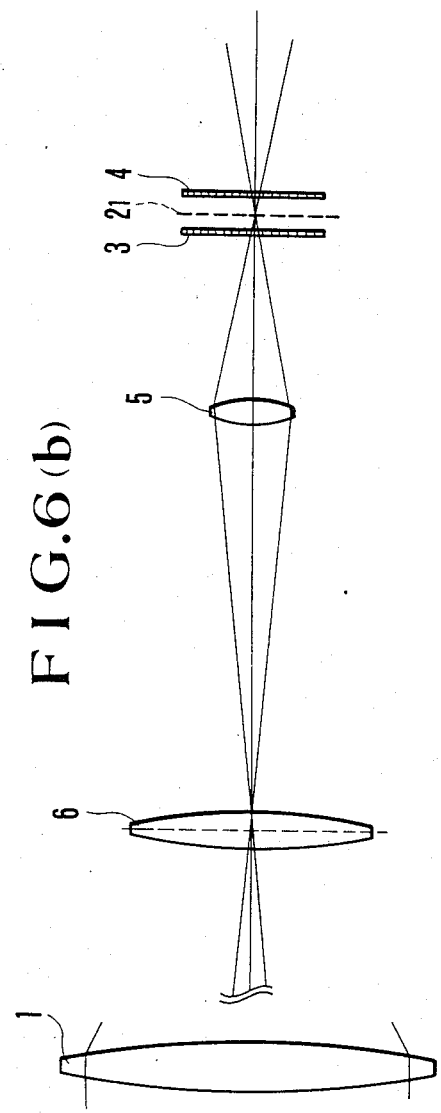
FIG.6(a)
FIG.6(b)

F I G.12
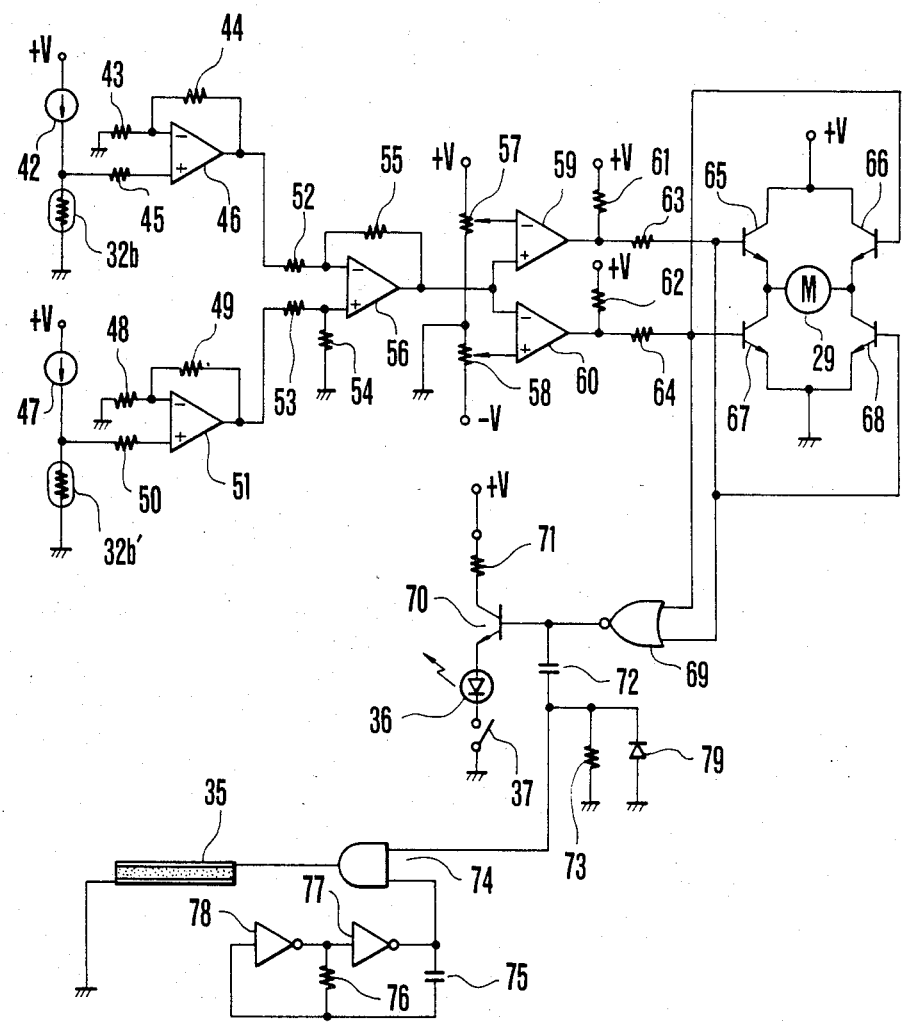

APPARATUS FOR DETECTING A CONDITION OF SHARPEST FOCUS

BACKGROUND OF THE INVENTION

1. Field of the Invention

This invention relates to apparatus for detecting an in-focus condition applicable to photographic instruments such as cameras, and more particularly to optical systems for focusing the reflected light from an object on photosensitive elements.

2. Description of the Prior Art

From the past, detection of the in-focus condition by sensing the degree of sharpness of an image of an object near the focal plane of an objective lens, or the so-called unsharp image dependent in-focus detecting method has been known.

FIGS. 1 to 3 are schematic views of an optical system employing the conventional typical unsharp image dependent in-focus detecting method.

FIG. 1(a) shows the system when an objective lens is in sharp focus, FIG. 2(a) shows the same when the objective lens is in near focus, and FIG. 3(a) shows the same when the objective lens is in far focus. FIGS. 1(b), 2(b) and 3(b) are waveforms of the output signals from photosensitive elements 3 and 4 in the respective operative positions.

The in-focus detecting method by the unsharp image is that the photosensitive elements 3 and 4 are provided near a prescribed focal plane $2_1$ of the objective lens 1 at respective positions $2_2$ and $2_3$ of forwardly and rearwardly equal axial distances from the plane $2_1$, and the output signals from the photosensitive elements 3 and 4 are compared with each other to detect focusing conditions of the objective lens 1.

As illustrated in FIG. 1(a), when the objective lens is in an in-focus condition, the output signals from the photosensitive elements 3 and 4, for example, with a point image, represent the same sizes of circles of diffusion and, therefore, are equal to each other in the width of waveform, D, as illustrated in FIG. 1(b). Accordingly, by sensing and comparing the widths, D, it is made possible to detect when the objective lens 1 comes to the in-focus condition.

When the objective lens 1 is in the near focus, as illustrated in FIG. 2(b), the width D of the output signal from the photosensitive element 3 becomes larger than that of the output signal from the photosensitive element 4. When in the far focus, it is inverted as illustrated in FIG. 3(b).

The thus-obtained focusing conditions of the objective lens 1 can be displayed in the field of view of the finder or fed back to adjust the objective lens by means known to those skilled in the art.

The unsharp image dependent in-focus detecting method makes sure the focusing operation is performed either visually or automatically only when the unsharpness of the image by the objective lens 1 is below a certain degree. Or otherwise the difference between the output signals of the two photosensitive elements, or the difference in contrast between the two images is left constant despite further excursion of the objective lens 1. As a result, it becomes impossible to detect the in-focus condition.

The contrast of the image on the photosensitive element surface is otherwise dependent upon the F-number (relative aperture) of the objective lens too. When the degree of unsharpness of the image becomes very large, however, any increase of the F-number of the objective lens does not result in creating a difference between the contrast signals from the two photosensitive elements, thus rendering it impossible to carry out the in-focus detection.

In such case, for the operator intends to adjust the objective lens to the in-focus condition by the signals obtained from the photosensitive elements, it becomes impossible to detect which direction the objective lens is to be moved to.

For this reason, upon preliminary movement of the objective lens in one direction, if the operator fails in finding out the in-focus condition, the objective lens is then moved in the opposite direction. Such procedure takes a long time to adjust the objective lens.

SUMMARY OF THE INVENTION

A first object of the present invention is to provide an apparatus of the character in which a pair of photosensitive elements 3 and 4 are arranged on opposite side of a prescribed focal plane $2_1$ in spaced relation by a predetermined distance, whereby even when the degree of unsharpness of the image formed on the photosensitive element by an objective lens is large, accurate in-focus detection can be achieved, and particularly to provide an image forming optical system adapted to be used in such apparatus.

To accomplish the above-described or first object, it is essential that the image forming optical system is formed with inclusion of a secondary image forming lens arranged on an optical axis between the aforesaid objective lens and the aforesaid pair of photosensitive elements.

A second object of the present invention is to achieve a further improvement of the above-stated first object by provision of a field lens between the aforesaid objective lens and the aforesaid secondary image forming lens, and to provide a focusing optical system which enables the in-focus detection to be carried out accurately even when the degree of unsharpness of the images of an object on the photosensitive elements is large.

A further or third object of the present invention lies in the following point. In the image forming lens system accomplishing the above-stated first object, for the purpose of minimizing the bulk and size of the lens system, it is required that the focal length $f_2$ of the aforesaid secondary image forming lens be decreased. But, fulfillment of this requirement involves creation of a difference in magnification between the similar images of an object on the two photosensitive elements arranged on opposite side of the prescribed focal plane. This image magnification difference takes place even when the two images of the same object formed by the objective lens represent an in-focus condition.

With the optical system of such construction that the object images are projected onto CCDs (Charge Couple Devices) or like image sensors as the photosensitive elements, when in sharpest focus, the outputs of the aforesaid pair of photosensitive elements (pair of CCDs) are, however, assumed to take quite equal waveforms to each other. Upon subsequent processing of the said outputs to form a focusing adjustment, therefore, the aforesaid image magnification difference in the form of a difference between the waveforms of the outputs of the photosensitive elements in pair induces for erroneous range finding.

Therefore, the third object of the present invention is to provide an in-focus detecting apparatus with the aforesaid secondary image forming lens having so small a focal length $f_2$ that when in sharpest focus the images on the photosensitive elements in pair appreciably differ in magnification from each other, whereby correction is made so as to equalize the outputs of the aforesaid pair of photosensitive elements.

BRIEF DESCRIPTION OF THE DRAWINGS

FIGS. 6(a) and 6(b) are schematic diagrams of another embodiment of the present invention.

FIG. 7 illustrates still another embodiment of the present invention.

FIG. 12 is an electrical circuit diagram of an autofocus apparatus responsive to the output signals from the photosensitive elements in the optical system of the invention for controlling adjustment of the objective lens.

DESCRIPTION OF THE PREFERRED EMBODIMENTS

Figure 1A:
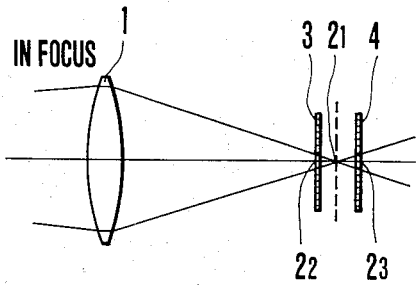
FIGS. 1(a)(b), 2(a)(b) and 3(a)(b) are schematic views of an optical system employing the conventional in-focus detecting method.
Figure 1B:
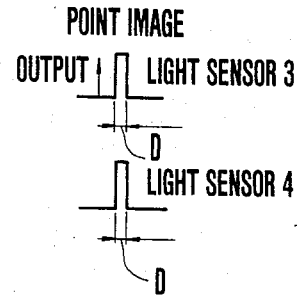
Figure 2A:
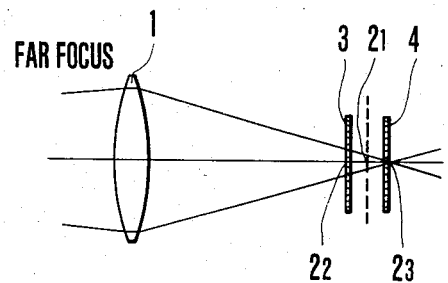
Figure 2B:
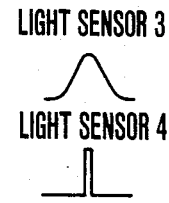
Figure 3A:
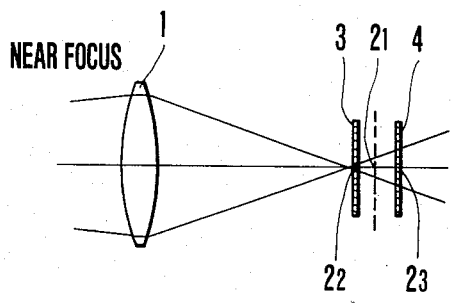
Figure 3B:
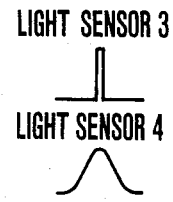
Figure 4:
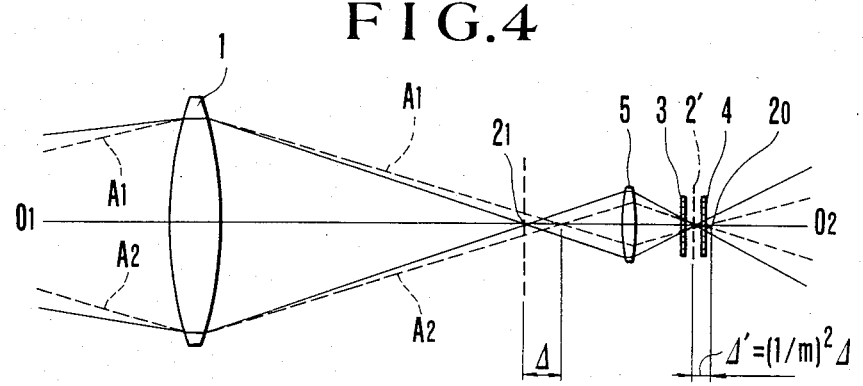
FIG. 4 is a diagram of geometry considered to explain the pre-design of an optical system employing one embodiment of the present invention.

FIG. 4 illustrates an embodiment of an image forming optical system in the in-focus detecting apparatus of the present invention. In the drawing, reference numeral 1 denotes an objective lens $0_1$–$0_2$ is an optical axis of the objective lens 1. 5 is a secondary image forming lens for re-focusing an image of the aforesaid objective lens 1. $2_1$ is a focal point of the objective lens 1. 2' is a prescribed focal plane of the secondary image forming lens 5. 3 and 4 are photosensitive elements positioned on opposite side of the aforesaid prescribed focal plane 2' at equal distances from the plane 2'. The aforesaid photosensitive elements are preferably, for example, CCDs (Charge Coupled Devices) or like image sensors. The secondary image forming lens 5 is positioned in a space between the objective lens 1 and the photosensitive element 3.

In general, determination of the distance at which each of the photosensitive elements 3 and 4 has to be positioned is made by taking into account the input information versus output information response characteristics of the photosensitive element, for example, the accuracy of responsibility of the output in the voltage waveform against the input in the form of light distribution on the surface of the photosensitive element. Therefore, when the degree of unsharpness of the image on the photosensitive element is large, the accuracy of informations in processing the output signals from the aforesaid photosensitive elements to find a condition of sharpest focus is decreased, thereby errors are introduced into the adjustment of the objective lens, and it takes a long time for the objective lens to reach the in-focus position.

In FIG. 4, dashed lines $A_1$ and $A_2$ represent rays of light when the secondary image forming lens 5 is out of use. In the case of the exclusion of the secondary image forming lens 5, as illustrated in the drawing, the focal point $2_0$ of the rays $A_1$ and $A_2$ appears not in a space between the photosensitive elements 3 and 4 but outside or behind it so that the images of the object on the photosensitive elements 3 and 4 are largely diffused, and, therefore, the output waveforms of the photosensitive elements 3 and 4 are unsuitable for later signal processing to detect focusing conditions. As a result, the accuracy of the range finding is lowered, and the time necessary to find the range is elongated.

The present invention is to make it possible to detect a condition of sharpest focus quickly and accurately by the use of the secondary image forming lens 5 in a space between the objective lens 1 and the photosensitive element 3 when the focus of the image by the objective lens 1 is otherwise largely displaced from the prescribed focal plane 2'.

That is, now assuming that the image magnification of the secondary image forming lens 5 is $1/m$ ($m > 1$), and the amount of displacement of the focal point of the objective lens 1 is $\Delta$, then we have the amount of displacement $\Delta'$ of the focal point of the secondary image forming lens 5 as expressed by:

$$\Delta' = (1/m)^2 \Delta$$

In other words, the amount of displacement $\Delta$ of the objective lens 1 is $(1/m)^2$ times reduced in the focal plane of the secondary image forming lens 5.

This implies that the use of the secondary image forming lens 5 provides correction of the focal point $2_0$ so as to fall between the photosensitive elements 3 and 4, and, as a result, improvements with respect to the degree of unsharpness of the images of the object on the photosensitive elements 3 and 4, thus contributing to an increase in the range finding accuracy and a decrease in the range finding time.

Further, this may be otherwise stipulated by taking the displacement on the optical axis with respect to the focal plane of the secondary image forming lens as the standard that the displacement of the objective lens 1 with respect to the focal plane thereof is $m^2$ times increased. Therefore, letting $\Delta'$ denote the allowable range of displacement of the focus of the image on the two photosensitive elements 3 and 4 in respect to the detection of the in-focus condition, we have $\Delta = m^2 \Delta'$. Thus, the in-focus detection possible range of axial excursion of the objective lens 1 is $m^2$ times extended.

Particularly with the secondary image forming lens 5 of an equal F-number (effective aperture ratio) to that of the objective lens 1, no vignetting takes place, and the contrast of the image can be reproduced as it is so that the in-focus detection range is $m^2$ times extended.

On the other hand, when the image magnification $1/m$ is made too small, the amount of displacement $\Delta'$ relative to the amount of displacement $\Delta$ becomes so small that no change in the signals obtained from the photosensitive elements 3 and 4 results. It is, therefore, not preferred that it is made too small. Therefore, the image magnification may lie within the following limits:

$$0.4 < 1/m < 0.8$$

It is to be noted that in the present invention the photosensitive elements 3 and 4 may be of such form as that disclosed in Japanese Patent Publication No. Sho 56-25648. Another example is a linear or two-dimensional array of elements from which obtained signals may be used to achieve the object of the present invention.

In the in-focus detecting method of the present invention, when the circle of diffusion of the image of an object point on the surface of the photosensitive element or the size of the unsharp image $\phi$ is larger than 1 (the length when the photosensitive elements are in the linear array, or the diagonal length when they are CdSs or in the two-dimensional array), the light distribution of the image on the photosensitive surface becomes uniform so that no in-focus signal is obtained.

Alternatively, when the photosensitive elements are too large in bulk, the space the apparatus as a whole occupies becomes large, and a high precision accuracy is required in manufacturing the photosensitive elements. These results are objectionable.

It is, therefore, recommended that the size of the photosensitive element lies between 1/15 and 1/10 times the effective picture area of the objective lens (the diagonal of the picture frame in the case of the film). When the size of the photosensitive element is smaller than 1/15 times the effective picture area, the field of coverage of the photosensitive element becomes too small to prevent the in-focus display from flickering, for example, in case apparatus is incorporated in the camera, as the object to aim at enters the filed of coverage at a time, and leaves at another time when the camera is hand-held. Conversely when the size of the photosensitive element is larger than 1/10 times the effective picture area, two or more objects of different distance enter the field of view of the photosensitive element at a time and a far and near concurrence takes place.

In application of the apparatus to, for example, 35 m/m single lens reflex cameras, the size of the photosensitive element is found to be 3.5 mm. In this case, the maximum possible diameter of the circle of diffusion of the image of a point in making sure a condition of sharpest focus is detected is 3.5 mm. With such apparatus when a telephoto objective having a relative aperture of F/4, an effective signal can be obtained within an excursion range of ±14 mm.

Figure 5A:
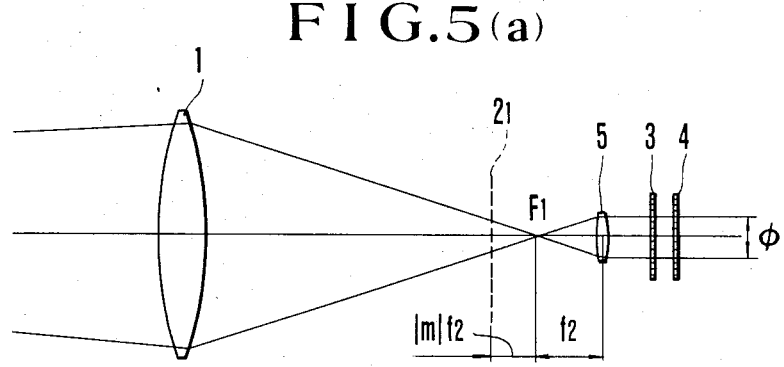
FIGS. 5(a) and 5(b) are similar to FIG. 4 except that two different focusing conditions of the optical system are illustrated.

Next, in the embodiment of the invention, when the focus of the image by the objective lens 1 is got largely away from the prescribed focal plane $2_1$ and comes to the front focal point $F_1$ of the secondary image forming lens 5, as illustrated in FIG. 5(a), the emerging rays from the lens 5 become parallel, thereby the diameters of the light beams arriving at the photosensitive elements 3 and 4 are rendered to be equal to each other, that is, the degrees of unsharpness of the images thereon to be equal to each other. As a result, the in-focus detecting signals become equal to each other so that in-focus detection can be no longer performed.

To avoid such situation, an additional or third photosensitive element may be used as arranged at a front conjugate point of the secondary image forming lens 5 (see FIG. 4). If so, the coincidence of all signals from the three photosensitive elements may be distinguished to be out of focus.

Figure 5B:
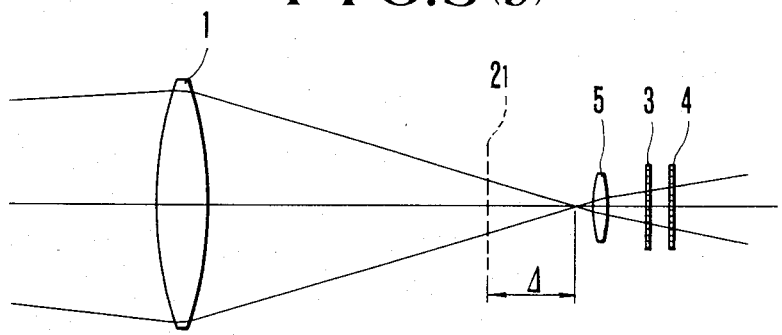

And, further excursion of the objective lens 1 brings the foucs of the image to a position illustrated in FIG. 5(b) where the emerging rays from the secondary image forming lens 5 at this time become diverging rays. As a result, the contrast signal from the photosensitive element 3 is smaller than that from the photosensitive element 4, causing the objective lens 1 to be taken as being in far focus despite the fact that it is in near focus.

It is, therefore, necessary to make sure the possibility of occurrence of the focus of the image by the objective lens 1 at any point behind the front conjugate point of the secondary image forming lens 5 is zero.

Concerning this, the following discussion is made about specifying the focal length of the secondary image forming lens 5.

In general, for most of the objective lenses having a focal length f, the shortest object distance is taken at a value of about 10f. At this time, the focus of the image by the objective lens changes its position by about 0.1f.

As a result, the distance from the prescribed focal plane of the objective lens to the front principal point of the secondary image forming lens is $|m| f_2$ where m and $f_2$ are the image magnification and the focal length of the secondary image forming lens respectively.

From this, $0.1f < |m| f_2$ is given. Hence we have $$f_2 > 0.1f |1/m| \tag{1}$$

To specify the shortest object distance of the objective lens 1 to $\beta$ times the focal length f, the inequality stated above becomes:

$$f_2 \beta \cdot f |1/m| \tag{2}$$

It is to be noted here that though no upper limit is specified, very large a value of the $f_2$ is not desirable because the bulk and size of the entire apparatus is objectionably increased.

It is to be also noted that the diameter of the secondary image forming lens 5 is preferably smaller than that of the photosensitive elements 3 and 4 to assure that the diameter of the light beam incident upon the photosensitive elements 3 and 4 is smaller at all times than the outer appearance the photosensitive elements have, and, therefore that a contrast signal is always obtained to effect detecting of a condition of sharp focus.

FIGS. 6(a) and 6(b) illustrate a further improved embodiment of the present invention.

When the aforesaid objective lens 1 is a long focal length lens, for example, a telephoto lens, the defocus amount becomes large.

The increase in the defocus amount leads to invite a loss of the accuracy of finding the object distance as a function of the output signals of the photosensitive elements.

This improved embodiment is to make use of a field lens near or at the prescribed focal plane of the objective lens so that the light beam from the objective lens is convergingly refracted to thereby reduce the defoucs amount.

In FIG. 6(a), 6 is a filed lens, said field lens being arranged at, or in the neighbourhood of, the prescribed focal plane of the objective lens. Dashed lines $E_1$ and $E_2$ represent rays of light traced from the objective lens on assumption that the field lens 6 and the secondary image forming lens 5 are excluded and reaching a focal point $P_1$ on an optical axis. When the objective lens 1 is in large excursion, the point $P_1$ of sharpest focus is at a large distance from the photosensitive elements. The positioning of the field lens 6 in the prescribed focal plane $P_4$ of the objective lens 1 provides assurance that the secondary image forming lens 5 admits of and refocuses the refracted rays of light by the said field lens 6 at a point $P_2$.

In FIG. 6(a), the position of the secondary image forming lens 5 is determined by the focal length and magnification of the secondary image forming lens 5.

As will be understood from FIG. 6(a), by the use of the field lens 6, the light beam from the objective lens 1 is directed so as to focus at a point $P_3$. From the relation of the distance, a, from the field lens 6 to the focal point $P_1$ and the distance, b, from the field lens 6 to the focal point $P_3$, it is evident that the defocus amount of the objective lens 1 is reduced from the distance, a, to the distance, b.

FIG. 6(b) illustrates another focusing position where the objective lens 1 focuses a sharp image at the prescribed focal plane. In this case, the point of sharp focus coincides with the point in position of the field lens 6 so that the rays of light passing through the secondary image forming lens 5 are focused on the prescribed focal plane 2' of the secondary image forming lens 5. Responsive to this, the photosensitive elements 3 and 4 produce equal output signals to each other which represent estabilishment of a condition of sharp focus.

FIGS. 7 to 10 illustrate another improved embodiment of the invention. In the image forming lens system using the secondary image forming lens 5 of the invention shown in FIG. 4, to achieve a minimization of the bulk and size of the apparatus, the focal length $f_2$ of the secondary image forming lens 5 is required to be reduced. Fulfillment of this requirement, however, gives rise to a problem that even in the condition of sharp focus where the light beam after having passed through the secondary image forming lens 5 focuses an image on the prescribed focal plane 2' of the secondary image forming lens 5, as illustrated in FIG. 7(a), two similar images $Y_1$ and $Y_2$ of an object (in this instance, arrow) on the respective photosensitive elements 3 and 4 differ in size or magnification from each other. This results in (1) that the front and rear photosensitive elements subtend different angular fields of view from each other, and (2) that the image $Y_2$ on the rear photosensitive element 4 becomes larger in size than the image $Y_1$ on the front photosensitive element 3 so that the signal of image contrast obtained from the photosensitive element 4 becomes smaller than that obtained from the photosensitive element 3. For this reason, an erroneous range finding is caused to occur.

The foregoing may be explained as follows:

According to the imaging theory of optics, the image formed by the lens is defined by convolution of an ideal image (that made up of the principal rays) assumed to involve no diffusion and a point image.

Figure 7A:
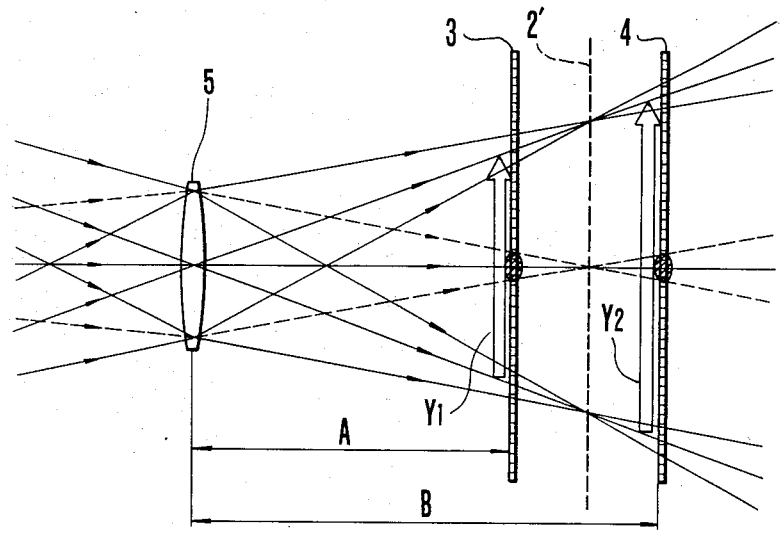
FIGS. 7(a) and 7(f) are diagrams of geometry considered to explain the image magnification difference.
Figure 7B:
FIGS. 7(b), 7(c), 7(d) and 7(e) are waveforms of light distribution over the surfaces of the sensors 3 and 4.
Figure 7C:

In a case where the images on the sensors 3 and 4 have despite the condition of sharpest focus to differ in magnification from each other as illustrated in FIG. 7(a), such light distributions as illustrated in FIGS. 7(b) and 7(c) are formed over the surfaces of the sensors 3 and 4.

In this case, output waveforms corresponding to the aforesaid light distributions of FIGS. 7(b) and 7(c) are such that because of the difference in the image magnification although the point images, or the circles of diffusion, are the same, the sensor 4 forms a signal as if the image of FIG. 7(c) thereon were lower in contrast.

Figure 7D:
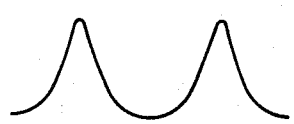
Figure 7E:
Figure 7F:
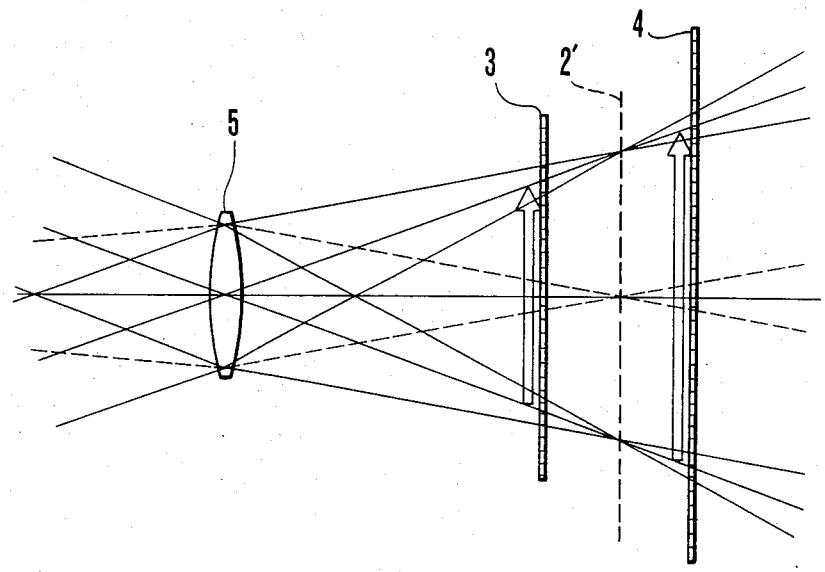
Figure 8A:
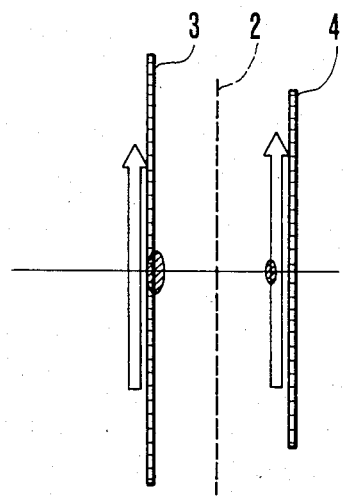
FIGS. 8(a) and 8(b) represent the pre-design of the embodiment shown in FIG. 7.

To compensate for this, the pitches of the sensor 4 are made rougher by the difference in the magnification as illustrated in FIG. 7(f) to permit similar signal processors to each other to be used in cooperation with the sensors 3 and 4 respectively. By this, the image magnifications are apparently equalized to each other as illustrated in FIG. 8(a). But, the point image itself is reduced in passing through the signal processor so that when the convolution is carried out, it results that the contrast is very increased as illustrated in FIG. 7(d). Thus, it occurs after all when in sharp focus that the signals from the sensors 3 and 4 differ in waveform from each other, leaving a possibility of introducing errors in the range finding procedure.

Figure 8B:
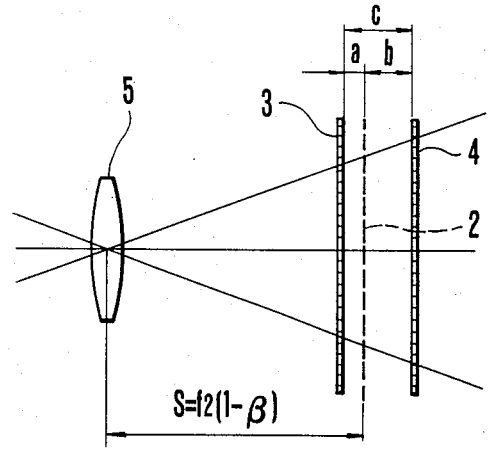

To prevent this, the positions of the sensors 3 and 4 relative to the prescribed focal plane of the secondary image forming lens are altered as illustrated in FIG. 8(b) so that the light distribution on the photosensitive surface of the sensor 4 is made as illustrared in FIG. 7(e) to be similar to that on the aforesaid sensor 3 in the circle of diffusion of the point image on the signal processing. Thus, the sensors 3 and 4 produce outputs of similar waveform.

It will be appreciated that the image magnifications and the circles of diffusion of the point images must be the same in view of the signal processing, or otherwise for the in-focus condition, the signals of the sensors 3 and 4 would not take the same waveform.

To prevent erroneous range finding, correction may be put to the front or the rear photosensitive element. In this embodiment, the rear photosensitive element is selected for the correction. The required value of the correction factor, $\alpha$, is only made equal to the ratio of the distances from the secondary image forming lens 5, or $\alpha = A/B$. For this purpose, the pitch and length of the rear photosensitive element are both formed to B/A times as large.

When such correction as illustrated in FIGS. 7(a) to 7(f) is added, the signals representing the sharp focus are different from each other since the image on the rear photosensitive element is smaller than that on the front one by the value of the correction factor. As a result, the rear photosensitive element produces a signal of such contrast as if it were increased. Therefore, a signal representing the detection of the condition of sharpest focus is given off when the objective lens takes a forwardly deviated position from the true one. For this reason, it is necessary to previously correct for that deviation. That is, as illustrated in FIG. 8(b), the distance, a, from the prescribed focal plane to the front photosensitive element, and the distance, b, from the prescribed focal plane to the rear photosensitive element are taken at the following values:

$$a = \frac{(S + C) + \sqrt{S^2 + C}}{2} \quad (3)$$

$$b = c - a \quad (4)$$

where S is the distance from the secondary image forming lens to the prescribed focal plane 2', and c is the optical path difference between the front and rear photosensitive elements.

The application of the correction to the rear photosensitive element is not only to prevent erroneous range finding due to the above-described phenomena (1) and (2), but also to have the role of reducing the range in which the images on the photosensitive elements 3 and 4 are reversed in size, and extending the range that allows an effective signal to be obtained.

Figure 9:
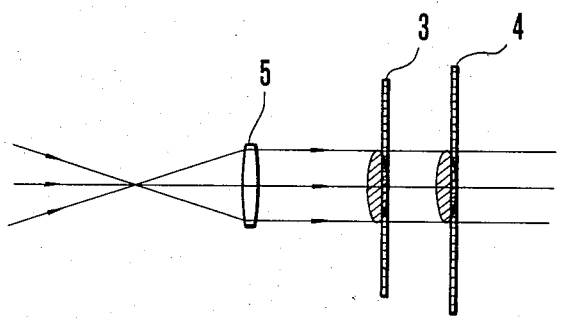
FIGS. 9 and 10 are fragmentary views of the projection of the images by the secondary image forming lens 5 of the present invention.

In this connection it should be explained by reference to FIGS. 9 and 10 that when the focal point of the objective lens comes to the front focal point of the secondary image forming lens 5, the image formed on the front photosensitive element 3 becomes equal in size to that formed on the rear photosensitive element 4. In this case, according to the prior art, it is impossible to detect the direction in which an adjustment of the objective lens must be made to bring the image into focus. According to the present invention, however, the rear photosensitive element 4 is corrected in view of the apparent proportional reduction of the image. Therefore, in terms of the signal, the image of the rear photosensitive element 4 is smaller than that of the front. Thus, it is still possible to detect a condition of near focus.

Figure 10:
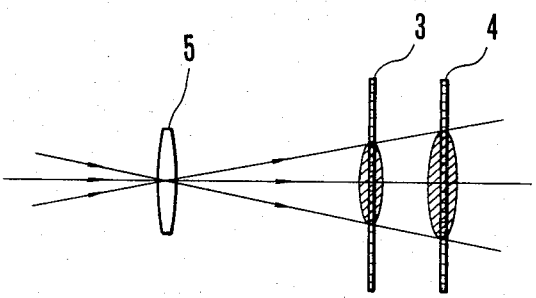

There is yet an event where the application of the correction loses its effect, because the images on the front and rear photosensitive elements 3 and 4 are sensed as are apparently equal in size to each other when the focal point of the objective lens coincides with the position of the secondary image forming lens 5 as illustrated in FIG. 10. When beyond this, the images on the front and rear photosensitive elements 3 and 4 have despite the application of the correction thereon to be inverted in apparent size, giving an erroneous detection of the direction in which an adjustment must be made to bring the image into focus.

Accordingly, as compared with the making no correction, the range of excursion of the objective lens is increased by a length equal to the focal length $f_2$ of the secondary image forming lens 5 without causing any erroneous range finding. In the case where the correction is applied to the rear photosensitive element 4, therefore, it is only required that instead of the above-stated inequality (1), the focal length $f_2$ of the secondary image forming lens satisfy the following inequality:

$$f_2 > \frac{0.1f}{1+m}$$

Figure 11:
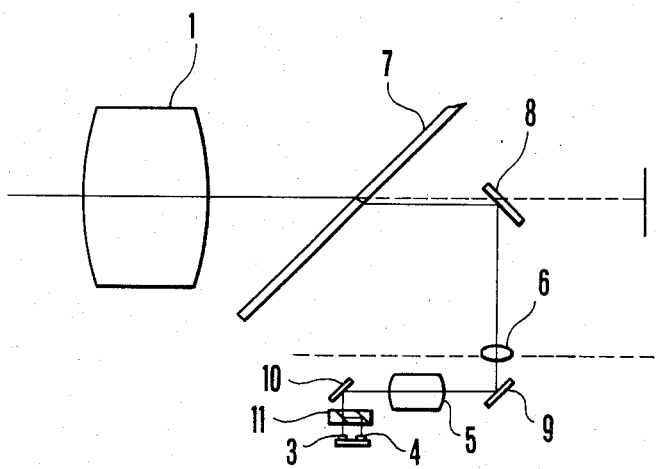
FIG. 11 is a schematic section view of a single lens reflex camera having the optical system of the invention.

FIG. 11 is a schematic view of an optical system in the conventional single lens reflex camera to which the in-focus detection apparatus of the invention is applied.

In the drawing, 1 is the objective lens; 7 is a quick return mirror; 8 is a submirror; 6 is a field lens, in the neighbourhood of which is a prescribed focal plane of the objective lens 1; 9 and 10 are reflection mirrors; 5 is the secondary image forming lens; 3 and 4 are the photosensitive elements; and 11 is a light splitter.

FIG. 12 illustrates an example of electrical circuitry suitable for use in an automatic focusing apparatus in which on the basis of the image forming optical system illustrated in the above-described embodiments are formed two images of an object on the photosensitive elements 3 and 4, and the output signals representing the degree of coincidence of the two images from the photosensitive elements 3 and 4 are processed to adjust the objective lens 1 in such a manner as to move the focus of the image along an optical axis. It is to be noted that the electrical circuit of FIG. 12 is disclosed in U.S. patent application Ser. No. 330,438 assigned to the assignee of the present invention. In the circuit of FIG. 12, reference characters 32a and 32b are used to denote photoconductive elements such as CdSs. By replacing said CdSs with CCDs as the photosensitive elements 3 and 4 of the present invention, however, the circuit of FIG. 12 can be applied to the circuit of the present invention. The construction of the circuit of FIG. 12 is outlined below. 42 and 47 are constant current sources; 43-46 and 48-51 are elements constituting non-inversion amplifier circuits; 52-56 are elements constituting a difference amplifier; 57-62 are elements constituting a window comparator; 65-68 are transistors constituting a bridge for controlling the operation of a reversible motor 29 in such a manner that when the comparator 59 produces an output of H level, the transistors 65 and 68 are ON, and when the comparator 60 produces an output of H level, the transistors 66 and 67 are ON; 63 and 64 are protection resistors for limiting the current flowing to these transistors; 69 is a NOR gate having an output which takes H level when the outputs of the comparators 59 and 60 are L level or when in sharp focus; 70 and 71 are a transistor and a resistor for driving a light-emitting diode (LED) 36; 72 and 73 are a condenser and a resistor for supplying an input to an AND gate 74 when the output of the NOR gate 69 rises; 75-78 are elements constituting an oscillator circuit; 79 is a diode; 35 is a buzzer; 37 is a switch for selectively turning on and off energization of LED 36.

In operating the circuit of such construction, the outputs of CdSs 32b and 32b' are applied through the respective non-inversion amplifiers to the difference amplifier 56. The output of the difference amplifier 56 representing the difference between the degrees of sharpness of the images on the CdSs is applied to the window comparator. This window comparator has two threshold levels. When the aforesaid difference between the degrees of image sharpness falls within these two limits, or in a range of allowance taken as the sharp focus, the outputs of the comparators 59 and 60 both take L level so that the reversible rotation control bridge for the motor 29 is not actuated. When the output of NOR gate 69 becomes H level, it is for a predetermined time depending upon the CR time constant of 72 and 73 that the buzzer 35 produces sound under the AND action with the oscillator circuit 74-78. Also with the switch 37 closed, the LED is energized for that predetermined time, indicating the detection of the condition of sharp focus along with the energized buzzer.

On the other hand, when the output of the aforesaid difference amplifier 56 lies outside the two threshold levels of the window comparator, for example, above the upper one, the outputs of the comparators 59 and 60 are of H and L levels respectively, thereby the transistors 65 and 68 are turned on to drive rotation of the motor 29 in a clockwise direction. When the image sharpness difference is below the lower limit, the output of comparator 59 becomes L level, and the output of comparator 60 becomes H level, thereby the transistors 66 and 67 are turned on. Then the motor 29 rotates in a counter-clockwise direction until the condition of sharp focus is reached.

As in the above, according to the present invention, the variation of the position of the image of the objective lens is reduced by the secondary image forming lens, thereby it being made possible to achieve an in-focus detecting apparatus having an extended range of operation that allows for detection of the condition of sharp focus.

What we claim:

1. An in-focus detecting apparatus comprising:
   (a) an objective lens for focusing an image of an object;
   (b) a secondary image forming lens arranged behind a focal plane of said objective lens to refocus the image formed by said objective lens to a reduced size; and
   (c) photosensitive elements arranged before and after a focal plane of said secondary image forming lens;
   (d) said secondary image forming lens having a reduced magnification 1/m which satisfies the following condition:

$$0.4 < 1/m < 0.8 \text{ (where } m > 1\text{)}$$

2. An in-focus detecting apparatus to claim 1, wherein the focal length $f_2$ of said secondary image forming lens satisfies the following condition:

$$f_2 > \beta \cdot f |1/m|$$

where $\beta$ is the ratio of the focal length f of said objective lens to the shortest object distance for said objective lens; f is the focal length of said objective lens; and m is the image magnification of said secondary image forming lens.

3. An in-focus detecting apparatus comprising:
   (a) an objective lens for focusing an image of an object;
   (b) a secondary image forming lens for re-focusing the image formed by said objective lens to a reduced size,
   said second image forming lens being arranged behind a focal plane of said objective lens;
   (c) a pair of photosensitive elements arranged at predetermined distances before and after a prescribed focal plane of said objective lens, said photosensitive elements comprising a pair of photosensitive elements spaced from said prescribed focal plane by said predetermined distances and producing electrical signals as a function of the light distribution of the images formed thereon with the light passing through said objective lens; and
   (d) a field lens arranged in a space between said objective lens and said secondary image forming lens to convergently reflect the light beam of the objective lens,
   (e) said field lens being arranged at a position equivalent to a prescribed focal plane of said objective lens or in the neighborhood of the equivalent position.

4. An in-focus detecting apparatus comprising:
   (a) an objective lens for focusing an image of an object;
   (b) a secondary image forming lens for re-focusing light from said objective lens;
   (c) at least two light receiving elements on the optical axis of the secondary image forming lens located before and after a prescribed focal plane of said secondary image forming lens; and
   (d) compensation means for compensating outputs of said photosensitive elements on the basis of difference in the image magnification of said object due to the difference in distance between said secondary image forming lens and each of said photosensitive elements.

5. An in-focus detecting apparatus comprising:
   (a) an objective lens for focusing an image of an object;
   (b) a secondary image forming lens for refocusing the light flux from said objective lens and having an optical axis; and
   (c) a pair of photosensitive elements arranged on the optical axis of the secondary image forming lens, before and after a predetermined focal plane of said secondary image forming lens, the distance between one of said photosensitive elements arranged before the predetermined focal plane and the other photosensitive element arranged after the predetermined focal plane satisfying the following conditions:

$$a = \frac{(S + C) + \sqrt{S^2 + C}}{2} \quad (1)$$

$$b = C - a \quad (2)$$

wherein
   a denotes the distance between the first photosensitive element and the prescribed focal plane of said secondary image forming lens;
   b denotes the distance between the rear photosensitive element and the prescribed focal plane of said secondary image forming lens; and
   C denotes the distance on the optical axis between said two photosensitive elements; and
   s denotes the distance from the secondary image forming lens to the prescribed focal plane.

6. An in-focus detecting apparatus comprising:
   (a) an objective lens for focusing an image of an object;
   (b) a secondary image forming lens for refocusing the light flux from said objective lens and having an optical axis; and
   (c) first and second sensors arranged on the optical axis of the secondary image forming lens, the first sensor arranged before a predetermined focal plane of said second image forming lens and the second sensor arranged after the predetermined focal plane,
   said first and second sensors each comprising a plurality of photosensitive elements connected in series, and the pitch of individual elements of the first sensor being different from that of the elements of the second sensor so as to equalize the output of the first sensor to that of the second sensor.

7. An in-focus detecting apparatus comprising:
   (a) an objective lens for focusing an image of an object;
   (b) a secondary image forming lens for refocusing the light flux from said objective lens and having an optical axis; and
   (c) a pair of photosensitive elements arranged on the optical axis of the secondary image forming lens, before and after a predetermined focal plane of said secondary image forming lens,
   said photosensitive element before the predetermined focal plane of the secondary image forming lens and the predetermined focal plane having a distance therebetween shorter than the distance between the photosensitive element after the predetermined focal plane and the predetermined focal plane.

8. An in-focus detecting apparatus according to claim 4, in which the compensating means compensates for the difference in the magnification of the object images formed on the two photosensitive elements by electrical treatment of signals of the two photosensitive elements.

* * * * *